United States Patent
Adgie et al.

(10) Patent No.: US 6,895,815 B2
(45) Date of Patent: May 24, 2005

(54) APPARATUS AND METHOD OF FLUID LEVEL MEASUREMENT

(75) Inventors: Glyn Martin Adgie, Moseley (GB); David Baylis, Acoeks Green (GB)

(73) Assignee: Electronic Product Design Limited, Tyseley (GB)

( * ) Notice: Subject to any disclaimer, the term of this patent is extended or adjusted under 35 U.S.C. 154(b) by 0 days.

(21) Appl. No.: 10/469,589

(22) PCT Filed: Feb. 28, 2002

(86) PCT No.: PCT/GB02/00822

§ 371 (c)(1),
(2), (4) Date: Mar. 15, 2004

(87) PCT Pub. No.: WO02/071007

PCT Pub. Date: Sep. 12, 2002

(65) Prior Publication Data

US 2004/0144171 A1 Jul. 29, 2004

(30) Foreign Application Priority Data

Mar. 1, 2001 (GB) .............................................. 0105064

(51) Int. Cl.⁷ .......................... G01F 23/28; G01M 25/56
(52) U.S. Cl. .................................... 73/290 V; 310/334
(58) Field of Search ............................... 73/642, 866.5, 73/290 V, 617, 644; 367/908, 103; 340/621; 310/324, 334

(56) References Cited

U.S. PATENT DOCUMENTS

| | | | |
|---|---|---|---|
| 3,357,246 A | * | 12/1967 | Richard et al. ........... 73/290 R |
| 3,834,233 A | | 9/1974 | Willis et al. |
| 4,015,319 A | | 4/1977 | Levine |
| 4,090,407 A | * | 5/1978 | Shuler et al. .............. 73/290 V |
| 4,101,865 A | * | 7/1978 | Schurr ....................... 73/290 V |
| 4,183,007 A | * | 1/1980 | Baird ......................... 367/119 |
| 4,264,788 A | * | 4/1981 | Keidel et al. ............... 310/334 |
| 4,928,525 A | * | 5/1990 | Aderholt et al. ........... 73/290 V |
| 4,984,449 A | * | 1/1991 | Caldwell et al. ............ 73/49.2 |
| 5,085,077 A | * | 2/1992 | Stapleton et al. ......... 73/290 V |
| 5,568,449 A | * | 10/1996 | Rountree et al. ............ 367/99 |
| 6,681,626 B2 | * | 1/2004 | Fünfgeld .................. 73/290 V |

FOREIGN PATENT DOCUMENTS

| | | | | |
|---|---|---|---|---|
| CH | 681914 A | | 6/1993 | |
| GB | 2188152 A | * | 9/1987 | ........... G01F/23/28 |

* cited by examiner

*Primary Examiner*—Hezron Williams
*Assistant Examiner*—John Fitzgerald
(74) *Attorney, Agent, or Firm*—Ronald E. Greigg

(57) ABSTRACT

An apparatus for fluid level measurement comprises an upright tube (10) extending into a storage tank (12) substantially the full height distance of the tank (12). An acoustic transducer (14) is positioned at the top of the tube (10) and adapted to emit a sound pulse to be bounced off the surface (16) of the fluid level within the tube (10) and to receive a reflected pulse. Means is provided for measurement of the time of arrival of the reflected sound pulse. An acoustic coupling means is provided for the transducer (14) to shape and increase the amplitude of the pulse emitted from the transducer (14) together with an increase in the amplitude of the voltage produced by the transducer (14) in response to the received reflected pulse.

16 Claims, 3 Drawing Sheets

APPARATUS AND METHOD OF FLUID LEVEL MEASUREMENT

CROSS-REFERENCE TO RELATED APPLICATIONS

This application is a 35 USC 371 application of PCT/GB 02/00822 filed on Feb. 28, 2002.

BACKGROUND OF THE INVENTION

Field of the Invention

This apparatus relates to an improved apparatus for fluid level measurement in a storage tank, and more particularly to the measurement of distance from a datum point to a fluid level in the tank by means of reflection of sound waves.

SUMMARY OF THE INVENTION

Numerous devices are known and used for determining fluid level in a container, but a disadvantage of existing apparatus is its lack of accuracy.

An object of the present invention is to obviate or mitigate the above disadvantage of the prior art. Accordingly, the present invention is an apparatus for fluid level measurement comprising an upright tube extending into a storage tank substantially the full height distance of the tank, an acoustic transducer positioned at the top of the tube and adapted to emit a sound pulse to be bounced off the surface of the fluid level within the tube and to received a reflected pulse, means for measuring of the time of arrival of the reflected sound pulse, and an acoustic coupling means for the transducer to shape and increase the amplitude of the pulse emitted from the transducer together with an increase in the amplitude of the voltage produced by the transducer in response to the received reflected pulse. The tube has an opening at its lower end portion to permit fluid in the tank to flow into the tube.

Preferably, the acoustic transducer is an assembly of a disc of piezo-electric material bonded to a larger disc of thin metal, the assembly generating sound in response to an applied voltage, and generating a voltage when the disc is vibrated by sound impinging on it.

Preferably also, the acoustic coupling means comprises a stopper for the upper end of the tube, the stopped having a conical passage axially thereof, the passage having a restricted throat at its upper end and an opening having substantially the same diameter as the tube at its lower end. The top of the stopper beneficially has a cylindrical recess of shallow depth, the throat of the passage axially entering the bottom of the recess with the transducer sealing off the top of the recess whereby the recess is air-tight except for the throat.

DESCRIPTION OF THE PRIOR ART

An embodiment of the present invention is described herein below with reference to the accompanying drawings, in which.

DESCRIPTION OF THE PREFERRED EMBODIMENT

Figure 1:
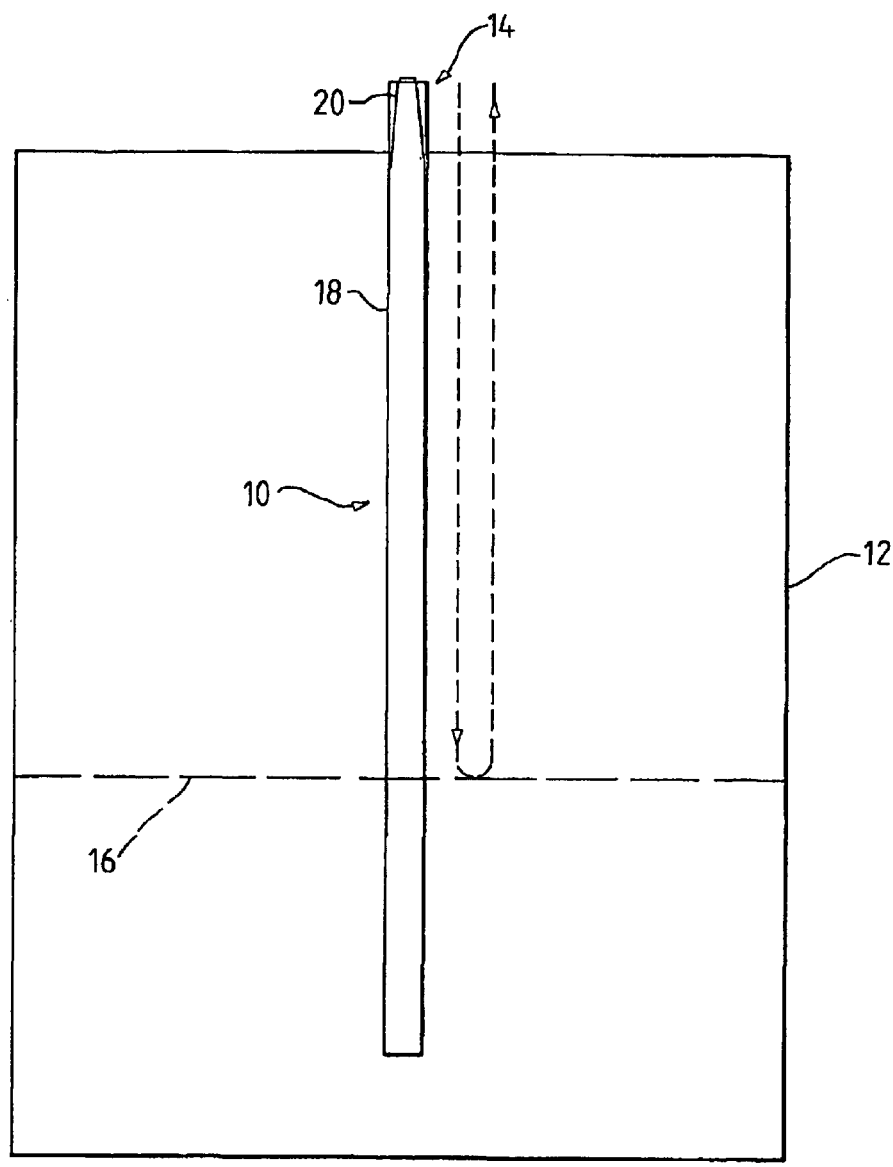
FIG. 1 is a diagrammatic side view of part of an apparatus for fluid level measurement according to the present invention.
Figure 3:
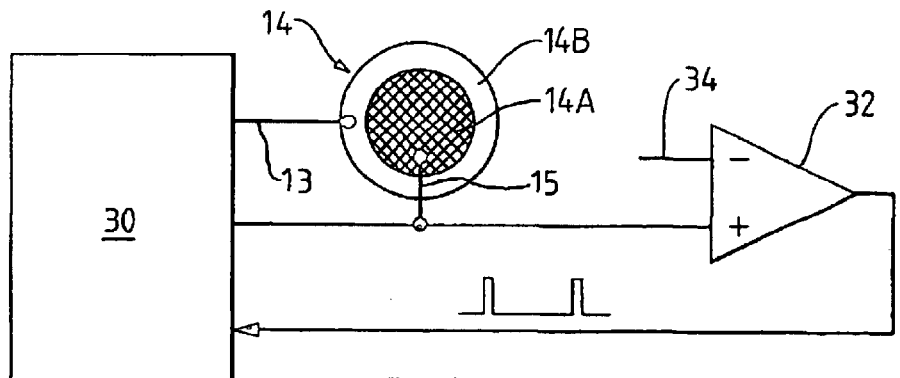
FIG. 3 is a driving and receiving electric circuit for the apparatus.
Figure 2:
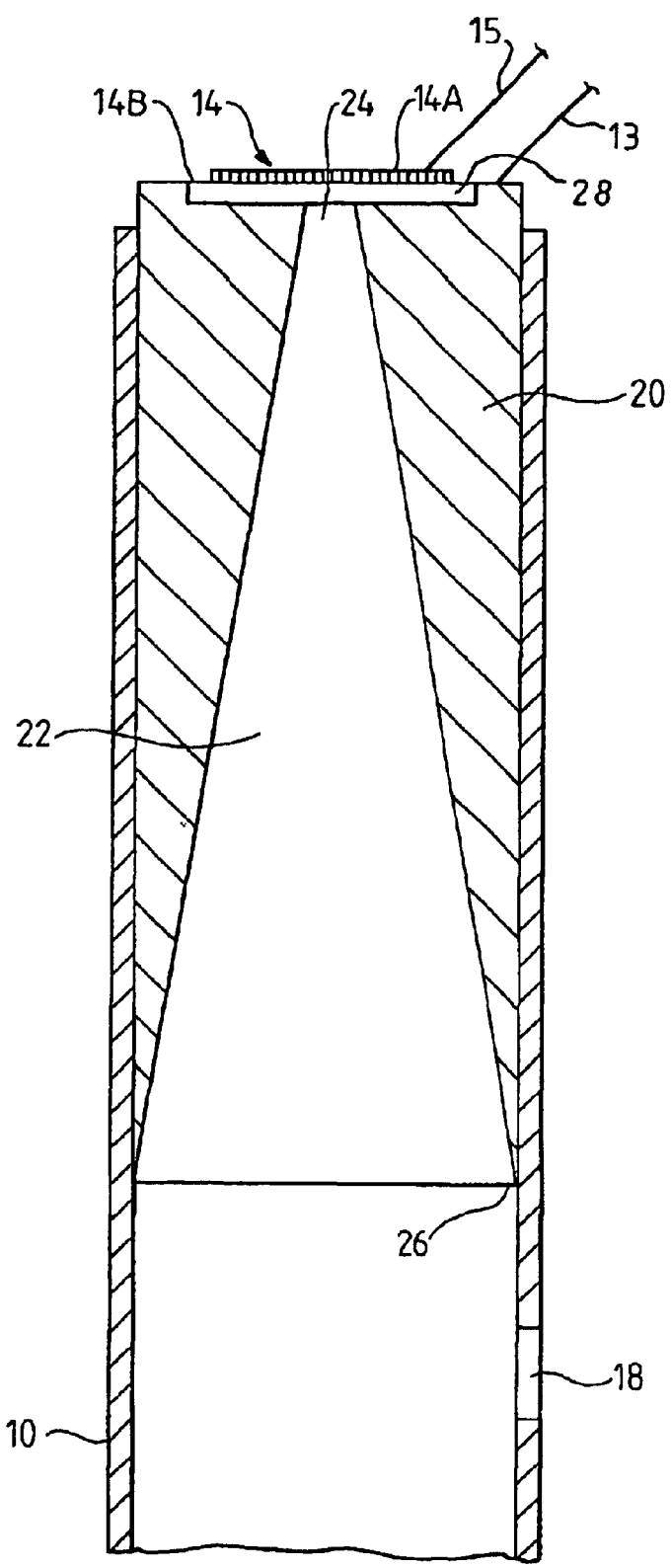
FIG. 2 is a cross-sectional view of a detail of the apparatus at an upper end and to a larger scale.

Referring to the drawings, an apparatus for fluid level measurement comprises an upright tube 10 extending into a storage tank 12 substantially the full height distance of the tank 12. An acoustic transducer 14 positioned at the top of the tube 10 and adapted to emit a sound pulse to be bounced off the surface 16 of the fluid level within the tube 10 and to receive a reflected pulse. Means is provided for measuring of the time of arrival of the received reflected sound pulse compared to the time of emission of a sound pulse. An acoustic coupling means is provided for the transducer 14 to shape and increase the amplitude of the pulse emitted from the transducer 14 together with an increase in the amplitude of the voltage produced by the transducer 14 in response to the received reflected pulse.

An acoustic transducer 14 is an assembly of a disc 14A of piezo-electric material bonded to a larger disc 14B of thin metal, the assembly generating sound in response to an applied voltage, arid generating a voltage when the disc 14B is vibrated by sound impinging on it. When a voltage is applied across the thickness of the disc 14A of piezo-electric material, it causes the disc 14B to bend, thus creating a deflection of the disc 14B from its resting position. A sudden deflection of the disc 14B causes a corresponding sound pulse to be transferred to the air surrounding the disc 14B. When the disc 14B is subject to a varying pressure due to sound waves, this causes the disc 14B to bend from its resting position, and the piezo-electric material then produces a voltage. A characteristic of this type of transducer is mechanical resonance. When a short pulse of voltage or sound is applied, the disc 14B vibrates at one or more characteristic frequencies. When the disc 14B is not subject to external mechanical resistance or damping, the vibrations typically last for many cycles. This is an undesirable characteristic in the context of this invention. The result of these extended vibrations is to make it difficult to determine the exact position in time of the acoustic pulse, so causing measurement uncertainties. This difficulty is overcome by the acoustic coupling means described herein.

The acoustic transducer is coupled to the tube 10, such that the vibration of the transducer causes sound waves to be launched in the air in the tube 10. Reflected waves coming back up the tube 10 vibrate the transducer 14. The transducer 14 is mounted above the highest expected liquid level in the tube 10. The diameter of the tube 10 is small compared to the range of wavelengths contained in the sound pulse, which means that the pulse travels in the tube 10 at the characteristic speed of sound. A second pulse generated at one end of the tube 10 travels with little attenuation down the tube 10, until it encounters a discontinuity. At the discontinuity, a proportion of the incident wave is reflected back up the tube 10, again experiencing little attenuation on the way back. When the discontinuity consists of a liquid surface 16, then because the liquid is far more dense than air, almost all the incident energy is reflected back up the tube 10. A breather hole 18 is provided in the tube 10, above maximum level of fluid allowed in the tank 12. This hole 18 allows the air pressure in the tube 10 to equalize with that of the surrounding air as the liquid level rises and falls in the tube 10. Some attenuation of sound occurs as it travels down the tube 10, this being greater as the tube 10 diameter is reduced. The attenuation is due to frictional losses near the wall of the tube 10 and is a fairly well defined exponential function of the distance travelled by the pulse. This effect can be compensated for by electronic means.

The acoustic coupling means comprises a stopper 20 for the upper end of the tube 10. The stopper 20 has a conical passage 22 axially thereof with the passage 22 having a restricted throat 24 at its upper end and an opening 26 having the same diameter as the tube 10 at its lower end. The top of the stopper 20 has a cylindrical recess 28 of shallow depth with the throat 24 of the passage 22 axially opening into the bottom of the recess 28 and the outer part of the disc 14B of the transducer 14 sealing off the top of the recess 28 whereby the recess 28 is air-tight except for the throat 24. The stopper 20 is sealed to the inside of the tube 10. The recess 28 when closed off by the disc 14B is shallow so that the air inside the cavity formed compresses only slightly when the disc 14B bends, thus efficiently transferring air pressure from the disc 14B to the throat 24. The effect of the cavity and the stopper 20 is to amplify the movement of air at the start of the tube 10, compared to coupling the transducer 14 to the tube 10 without the acoustic coupling means. The amplification effect of the acoustic coupling means is beneficial to the invention as the increased sound pressure in the tube 10 helps to dampen out the undesirable external sounds that might otherwise cause measurement errors. The amplification works equally well for the received reflected pulse, so increasing the resultant received voltage.

The acoustic coupling means provides mechanical damping to the surface of the transducer disc 14B thus damping out the undesirable resonances of the disc 14B. This mechanical damping arises because the improved coupling causes significant energy to be radiated down the tube 10 when the disc 14B moves, thus causing the disc 14B to experience a significant mechanical resistance.

In practice, the acoustic coupling means produces resonances of its own, in addition to the resonances of the transducer disc 14B. The effects of these can be minimised by the appropriate choice of length of stopper 20, diameter of throat 24 and cavity volume in the closed recess 28.

When the resonances are well damped by the acoustic coupling means, the shape of the received pulse tends towards a shorter duration impulse, with a well-defined position in time. In practice, some lower amplitude oscillations can be tolerated before the main impulse, provided subsequent electronic means can discriminate between the occurrence of the main pulse, and the earlier "spurious" pulse.

To generate an impulsive force to the piezo-electric disc 14A, a narrow pulse of voltage is applied to the piezo-electric disc 14A. Such a waveform may readily be generated by a logic circuit or microcontroller logic output. The pulse width has some effect on both the amplitude and shape of the subsequent received pulse. This can be adjusted empirically.

Since the transducer 14 is used for receiving as well as transmitting pulses, the pulse generator needs to disconnect from one terminal of the piezo-electric disc 14A after the pulse has been launched. The other terminal of the piezo-electric disc 14A is held at a constant voltage when ready to receive pulses. When using a logic circuit or a microcontroller 30 (as shown), this disconnection of one-terminal can be achieved by setting a relevant output pin (not shown), to an open-circuit state.

The pulse detector consists of a voltage comparator 32 with one input connected to the "free" terminal of the piezo-electric disc 14A. The other input of the voltage comparator 32 is connected to a reference voltage 34. When the amplitude of the received pulse exceeds the reference voltage, the output of the comparator 32 changes state. This change of state is used to trigger subsequent logic or timing means of the microcontroller 30.

The means for measuring the time of arrival of the received reflected sound pulse compared to the time of emission of a sound pulse is a facility incorporated into the microcontroller 30.

To measure the distance from the transducer 14 down the tube 10 to the liquid surface 16, a timing circuit is used to measure the time interval from the end of the driving pulse, to the arrival of the first reflected pulse, as indicated by the pulse detector. This distance in meters is given by ct/2, where c is the speed of sound in air (343 meters per second at 20° centigrade), and t is the measured time interval in seconds.

The distance to liquid level readings is then converted into liquid volume readings. In a typical application of the invention, the value of the measured distance to the surface of the fluid is converted into a fluid volume reading. The conversion formula depends upon the size and shape of the tank containing the fluid.

Compensation for the attenuation of the sound as it travels down the tube 10 can be provided for as well as compensation for variations in readings due to ambient temperature changes. As the sound pulse travels down the tube 18, it is attenuated due to frictional effects on the walls of the tube. The reflected sound pulse is also attenuated. The amount of attenuation increases with the length of the tube. The attenuation is an exponential function of the distance travelled by the sound pulse.

The attenuation of the sound pulse in a long tube means that the comparator 32 will fail to detect pulses that are attenuated so that their level is below the threshold on input 34 of the comparator. To eliminate this undesirable effect, means is provided to reduce the threshold on input 34 with time, such that the pulses received in a short time are detected with a high threshold, and pulses that are received in a long time are detected with a lower threshold.

Figure 4A:
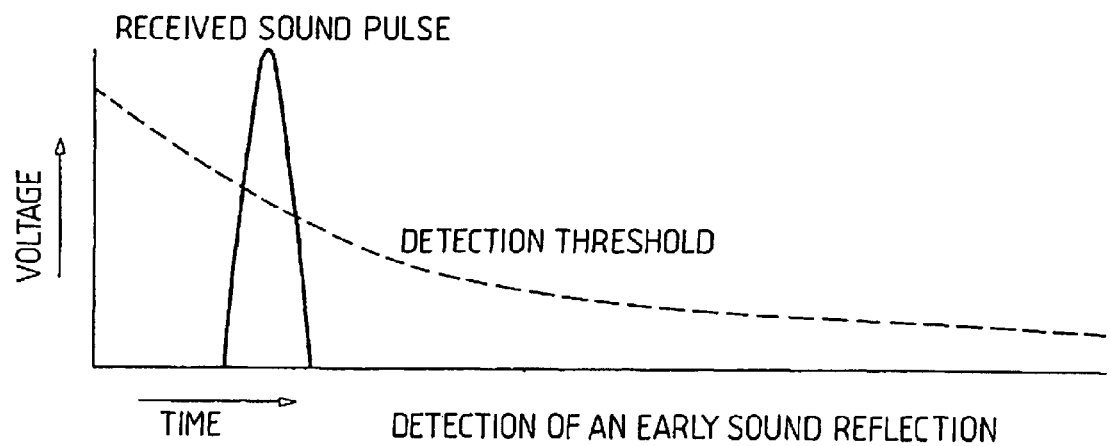
FIGS. 4A and 4B are two graphs of voltage against time respectively showing the state of detection of an early sound reflection, and of a later sound reflection.
Figure 4B:
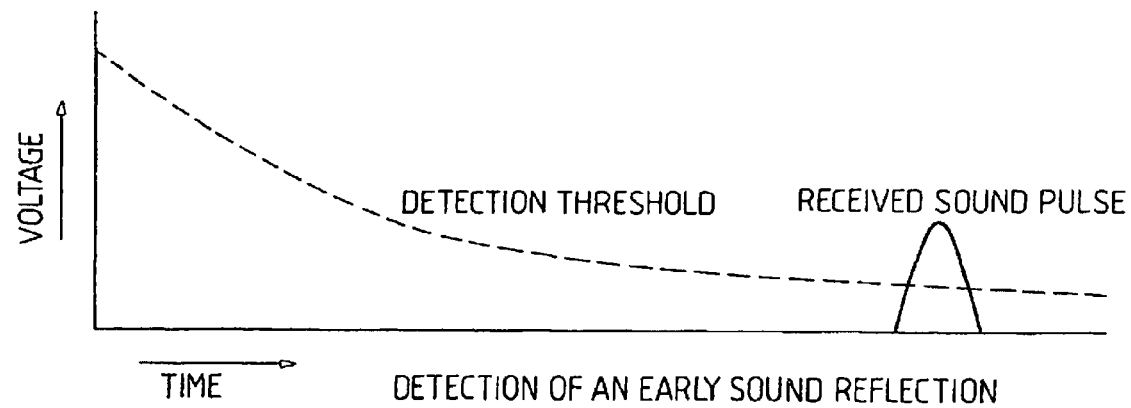

The amplitude of a sound pulse travelling in a tube is a negative exponential function of the distance travelled. This means that the amplitude of the received pulse is a negative exponential function of the time of arrival. To compensate for the attenuation of the sound pulse, the threshold voltage should therefore be decreased exponentially with time, as shown in FIG. 4.

Exponential adjustment of the threshold with time can be provided by supplying the threshold input 34 from a capacitor. When the sound pulse is transmitted, the capacitor is charged-up to a voltage that provides a threshold suitable for early reflected pulses. The capacitor is arranged to be discharged by a resistor, such that the threshold decreases exponentially with time. The values of the capacitor and resistor are arranged such that the rate of decay of the threshold voltage matches the rate of decay of the reflected pulse amplitude.

The speed of sound in gases increases with increasing temperature of the gas. This means that the measurement of distance by means of measuring the time of arrival of a reflected sound pulse is subject to inaccuracy if the temperature of the gas is not constant.

To reduce this undesirable inaccuracy, the microcontroller 30 can be provided with a temperature sensing means. The microcontroller determines the temperature of the gas in the tube 10, and calculates the correct distance value, based on both the time of arrival of the reflected sound pulse, and the measured temperature of the gas in the tube.

Alternatively, the inaccuracies in the measurement of distance due to variations in the speed of sound may be reduced by providing a second tube, stopped at the far end. The second tube is in the same gas atmosphere as the main tube, such that the speed of sound in both tubes is substantially the same. The second tube is equipped with the same sound production and detection means as the main tube. The microcontroller measures the time delay in the second tube. Since the distance to the stopper end of the second tube is constant, the actual speed of sound may be calculated from knowledge of the measured time delay and the known length of the second tube. The mircrocontroller 30 determines the speed of sound from a measurement of the time delay in the second tube. It uses the measured speed of sound to determine the distance to the fluid in the main tube. This method of compensation has the advantage that it does not require prior knowledge of the characteristics of the gas in which the measurement tube is immersed. This will be useful when the gas above the fluid is not air. If the gas is not air, the speed of sound is different from that of air. For example, the speed of sound in carbon dioxide is substantially lower than that in air.

Variations and modifications can be made without departing from the scope of the invention described above and as claimed hereinafter.

What is claimed is:

1. An apparatus for fluid level measurement comprising an upright tube extending into a storage tank substantially the full height distance of the tank, an acoustic transducer positioned at the top of the tube and operable to emit a sound pulse to be bounced off the surface of the fluid level within the tube and to receive a reflected pulse, means for measuring the time of arrival of the reflected sound pulse, and an acoustic coupling means for the transducer to shape and increase the amplitude of the pulse emitted from the transducer together with an increase in the amplitude of the voltage produced by the transducer in response to the received reflected pulse wherein the acoustic coupling means comprises a stopper for the upper end of the tube, the stopper having a conical passage axially thereof, the passage having a restricted throat at its upper end and an opening having substantially the same diameter as the tube at its lower end, and wherein the top of the stopper has a recess of shallow depth, the throat of the passage axially entering the bottom of the recess and the transducer sealing off the top of the recess whereby the recess is air-tight except for the throat.

2. An apparatus according to claim 1, wherein the acoustic transducer comprises an assembly of a disc of piezo-electric material bonded to a larger disc of thin metal, the assembly generating sound in response to an applied voltage, and generating a voltage when the disc is vibrated by sound impinging on it.

3. An apparatus according to claim 1, wherein the stopper is sealed to the inside of the tube.

4. An apparatus according to claim 1, wherein the acoustic coupling means is shaped and dimensioned to provide mechanical damping to the transducer during use by the action of said sound pulses.

5. An apparatus as claimed in claim 4, wherein the transducer is mounted on the acoustic coupling means such that the disc of metal is located between the disc of piezo-electric material and the conical passage.

6. An apparatus as claimed in claim 1, further comprising a pulse detector having a voltage comparator that has a first input connected to the transducer and a second input connected to a reference voltage that decreases, during use, exponentially with time.

7. An apparatus as claimed in claim 6, further including a capacitor, the capacitor being arranged to supply the reference voltage to the second comparator input.

8. An apparatus as claimed in claim 7, wherein the capacitor, after charging, provides an initial reference voltage, and is arranged to be discharged by a resistor such that the reference voltage decreases exponentially with time.

9. An apparatus for fluid level measurement comprising a tube which, in use, is upright and extends into a storage tank substantially the full height distance of the tank, an acoustic transducer positioned at the in use top of the tube and adapted to emit a sound pulse to be bounced off the surface of the fluid level within the tube and to receive a reflected pulse, means for measuring the time of arrival of the reflected sound pulse, and an acoustic coupling means for the transducer to shape and increase the amplitude of the pulse emitted from the transducer together with an increase in the amplitude of the voltage produced by the transducer in response to the received reflected pulse, wherein the acoustic coupling means comprises a stopper for the in use top end of the tube, the stopper having a conical passage extending axially thereof, the passage having a restricted throat at its in use top end and an opening having substantially the same diameter as the tube at its in use lower end, and wherein the acoustic coupling means is shaped and dimensioned to provide mechanical damping to the transducer during use by the action of said sound pulses.

10. An apparatus according to claim 9, wherein the acoustic transducer is an assembly of a disc of piezo-electric material bonded to a larger disc of metal, the assembly generating sound in response to an applied voltage, and generating a voltage when the disc is vibrated by sound impinging on it.

11. An apparatus according to claim 9, wherein the in use top of the stopper has a recess of shallow depth, the throat of the passage axially entering the in use bottom of the recess and the transducer sealing off the in use top of the recess so that the recess is air-tight except for the throat.

12. An apparatus according to claim 11, wherein the stopper is sealed to the inside of the tube.

13. An apparatus according to claim 10, wherein the transducer is mounted on the acoustic coupling means such that the disc of metal is located between the disc of piezo-electric material and the conical passage.

14. An apparatus according to claim 9, further comprising a pulse detector having a voltage comparator that has a first input connected to the transducer and a second input connected to a reference voltage that decreases, during use, exponentially with time.

15. An apparatus according to claim 14, further including a capacitor, the capacitor being arranged to supply the reference voltage to the second comparator input.

16. An apparatus as claimed in claim 15, wherein the capacitor, after charging, provides an initial reference voltage, and is arranged to be discharged by a resistor such that the reference voltage decreases exponentially with time.

* * * * *